GIVEN, HUTSONHILLER, & GILBERT.
Wheel-Cultivator.

No. 46.657. Patented Mar. 7, 1865.

WITNESSES:

INVENTOR'S:

UNITED STATES PATENT OFFICE.

JOHN H. GIVEN, HENRY HUTSONPILLER, AND CHAS. GILBERT, OF DES MOINES, IOWA.

IMPROVEMENT IN CULTIVATORS.

Specification forming part of Letters Patent No. 46,657, dated March 7, 1865.

*To all whom it may concern:*

Be it known that we, JOHN H. GIVEN, HENRY HUTSONPILLER, and CHARLES GILBERT, of Des Moines, in the county of Polk and State of Iowa, have invented a new and Improved Cultivator; and we do hereby declare that the following is a full, clear, and exact description thereof, which will enable others skilled in the art to make and use the same, reference being had to the accompanying drawings, forming part of this specification, in which—

Figure 1:
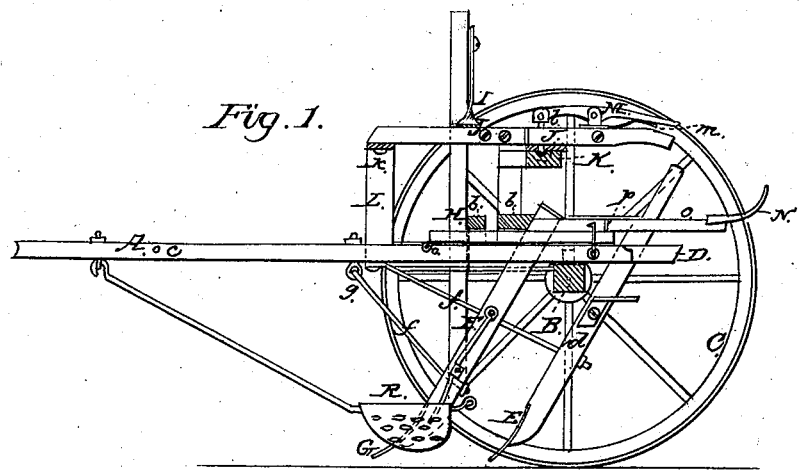
Figure 2:
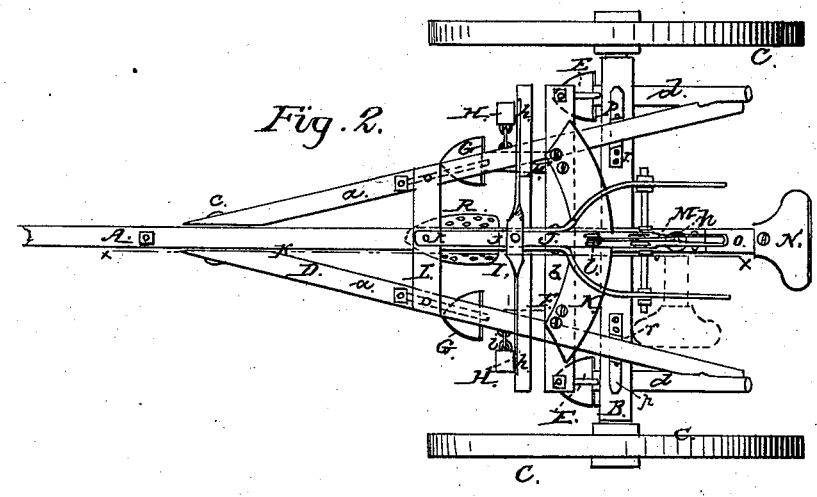

Figure 1 represents a side sectional view of our invention, taken in the line $x\,x$, Fig. 2; Fig. 2, a plan or top view of the same.

Similar letters of reference indicate like parts.

This invention relates to a new and improved cultivator for plowing or cultivating corn and other crops which are grown in hills or drills.

The invention also relates to a new and improved means for elevating the plows or raising them out of the ground when required, and also to an improved means for moving the plows laterally, as hereinafter fully set forth.

A represents the tongue or draft-pole, the back end of which is attached at right angles to an axle, B, having a wheel, C, at each end of it.

D represents a triangular frame composed of two oblique bars, $a\,a$, connected by cross-bars $b\,b$. The front ends of the oblique bars $a\,a$ are connected to the draft-pole A, one at each side, by a bolt, $c$, and to the back end of each bar $a$ an inclined standard, $d$, is permanently attached, said standards having a plow, E, secured to their lower ends. These plows may be of the usual shovel form.

To the back cross-bar, $b$, of the frame D there are attached by pivots two standards, F F. These standards are allowed to swing freely to the right and left on the pivots, and said standards have a plow, G, attached to their lower ends. The standards $d$ F are secured or held in position by braces $f\,f'$, the former, $f$, of the standards F being provided with joints $g$ to admit of the lateral swinging of F.

H H are two uprights, which are secured by pivots $h$ to the front cross-bar, $b$, of the frame D, one near each end. The lower ends of these uprights are connected by links $i$ to the standards F F, and the upper parts of the uprights above the frame D are connected by a curved bar, I, which is connected at its center, by a pivot, $j$, with a lever, J, the front end of the latter being attached by a pivot, $k$, with a semicircular bar, L, on the front part of the frame D.

The lever J works over a curved bar, K, on the frame D, having a hole at its center to receive a pin, $l$, at the front end of a lever, M, on the lever J, a spring, $m$, bearing against the under side of M, and having a tendency to keep the pin $l$ in the hole in the bar K. (See Fig. 1.) The pin $l$, when in the hole of bar K, prevents the lever J from casually moving either to the right or left, and consequently retains the uprights H H in a vertical position, and also the plow-standards F F, as regards a longitudinal direction of the machine.

N represents a driver's seat which is on the back of a bar, O, the front end of which is attached by a joint, $o$, to the draft-pole.

In order to move the plows G G laterally, which is often necessary to make them conform to the sinuosities of the rows of plants under cultivation, the driver, by depressing the back end of the lever M, raises the pin $l$ out from the hole in the bar K and moves the lever J, thereby actuating the uprights H H, and moving the standards F and plows G either to the right or left.

We employ a guard or protector, R, between the two plows G G, to prevent said plows from casting clods of earth upon the plants. This device, however, has been previously used, and forms no part of the invention.

The bar O, to which the driver's seat is attached, is composed of two parts connected by a joint, $p$, which admits of the seat N being turned around out of the way of the driver when the latter desires to walk behind the machine, (see red lines, Fig. 2,) and to one or both of the bars $a$ of the frame D there are attached angle-plates $g$, which may be adjusted higher or lower, as desired, to regulate the depth of the penetration of the plows into the ground, said plates resting on the axle B. Plates or brackets $r$ are also attached to axle B to prevent any lateral movement of the frame D and the plows E E when the plows G are moved laterally.

We claim as new and desire to secure by Letters Patent—

1. The frame D, pivoted or attached to the draft-pole A, as shown, in connection with the jointed seat-bar O, angle-plates $p$, and the plates $r$, all arranged to admit of the ready elevation of the plows, as set forth.

2. The uprights H H, connected at their upper parts to the lever J, and connected at their lower parts to the plow-standards F F, and pivoted to the frame D, substantially as shown and described, to admit of the lateral movement of the plows G, as described.

JOHN. H. GIVEN.
HENRY HUTSONPILLER.
CHARLES GILBERT.

Witnesses:
ELISHA WALKER,
M. S. DICKERSON.